(12) United States Patent
Bedillion et al.

(10) Patent No.: US 7,983,138 B2
(45) Date of Patent: Jul. 19, 2011

(54) SURFACE SPACING USING RIGID SPACERS

(75) Inventors: Mark David Bedillion, Allison Park, PA (US); Patrick Breckow Chu, Wexford, PA (US); Narayanan Ramakrishnan, Pittsburgh, PA (US); James Dillon Kiely, Sewickley, PA (US); Gudrun Ghilaine Agnes De Gersem, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1266 days.

(21) Appl. No.: 11/606,528

(22) Filed: Nov. 30, 2006

(65) Prior Publication Data

US 2008/0088976 A1 Apr. 17, 2008

Related U.S. Application Data

(63) Continuation-in-part of application No. 11/545,896, filed on Oct. 11, 2006.

(51) Int. Cl.
*G11B 9/00* (2006.01)
*G11B 11/00* (2006.01)
(52) U.S. Cl. ............. 369/258.1; 360/246.1; 369/126
(58) Field of Classification Search .......... 360/246.1, 360/237.1, 240, 246.2, 294.1; 369/258.1, 369/244.1, 247.1
See application file for complete search history.

(56) References Cited

U.S. PATENT DOCUMENTS

| 4,666,315 | A | * | 5/1987 | Scranton ..................... 384/1 |
| 5,557,596 | A | | 9/1996 | Gibson et al. |
| 5,834,864 | A | | 11/1998 | Hesterman et al. |
| 5,936,799 | A | * | 8/1999 | Kuratomi ................. 360/97.03 |
| 5,986,381 | A | | 11/1999 | Hoen et al. |
| 6,369,400 | B1 | * | 4/2002 | Haeberle et al. ............. 250/548 |
| 6,421,207 | B1 | * | 7/2002 | Sato ..................... 360/246.4 |
| 6,465,355 | B1 | | 10/2002 | Horsley |
| 6,590,747 | B1 | * | 7/2003 | Boutaghou et al. ........ 360/294.3 |
| 6,590,850 | B2 | | 7/2003 | Eldredge et al. |
| 6,632,698 | B2 | | 10/2003 | Ives |
| 6,657,444 | B2 | | 12/2003 | Fasen |
| 6,738,336 | B2 | | 5/2004 | Naberhuis |
| 6,775,034 | B1 | | 8/2004 | Morford |
| 6,784,592 | B2 | * | 8/2004 | Hartwell ................... 310/309 |
| 6,784,593 | B2 | | 8/2004 | Hartwell |

(Continued)

FOREIGN PATENT DOCUMENTS

WO WO 2006005643 A1 * 1/2006

OTHER PUBLICATIONS

A. Crossley et al., "Tribology of Diamond-Like Carbon Films From Generic Fabrication Routes Investigated by Lateral Force Microscopy", J. Phys. D: Appl. Phys., vol. 31, 1998, pp. 1955-1962.

(Continued)

*Primary Examiner* — Burton Mullins
(74) *Attorney, Agent, or Firm* — Robert P. Lenart, Esq.; Pietragallo Gordon Alfano Bosick & Raspanti, LLP

(57) ABSTRACT

An apparatus comprises a storage medium, a substrate separated from the storage medium by a gap, and a plurality of spacers defining a distance between the storage medium and the substrate, wherein the spacers include a curved end.

20 Claims, 13 Drawing Sheets

U.S. PATENT DOCUMENTS

| | | | |
|---|---|---|---|
| 6,784,630 | B2 | 8/2004 | Hartwell |
| 6,882,019 | B2 * | 4/2005 | Walmsley et al. ............ 257/415 |
| 6,888,362 | B2 * | 5/2005 | Eldridge et al. ......... 324/754.07 |
| 6,925,047 | B2 | 8/2005 | Ives |
| 2005/0252293 | A1 * | 11/2005 | Won et al. .................. 73/514.32 |
| 2007/0063141 | A1 * | 3/2007 | Duerig et al. ................. 250/309 |
| 2007/0290282 | A1 * | 12/2007 | Belov et al. ................... 257/421 |
| 2010/0046350 | A1 * | 2/2010 | Mori et al. .................... 369/126 |

OTHER PUBLICATIONS

Q. Wei et al., "Preparation of Superhard Functionally Graded Tetrahedral Amorphous Carbon Coatings by Pulsed Laser Deposition", Mat. Res. Soc. Symp., vol. 617, 2000, pp. J7.7.1 to J7.7.6.

J. A. Heimberg et al., "Superlow Friction Behavior of Diamond-Like Carbon Coatings: Time and Speed Effects", Applied Physics Letters, vol. 78, No. 17, Apr. 23, 2001, pp. 2449-2451.

L. Kogut et al., "A Semi-Analytical Solution for the Sliding Inception of a Spherical Contact", Journal of Tribology, vol. 125, Jul. 2003, pp. 499-506.

E. Riedo et al., "Young Modulus Dependence of Nanoscopic Friction Coefficient in Hard Coatings", Applied Physics Letters, vol. 83, No. 10, Sep. 8, 2003, pp. 1986-1988.

L. Kogut et al., "A Static Friction Model for Elastic-Plastic Contacting Rough Surfaces", Transactions of the ASME, vol. 126, Jan. 2004, pp. 34-40.

C.-H. Hsueh, "Master Curves for Hertzian Indentation on Coating/Substrate Systems", J. Materials Res., vol. 19, No. 1, Jan. 2004, pp. 94-100.

C.-H. Hsueh, "Combined Empirical-Analytical Method for Determining Contact Radius and Indenter Displacement During Hertzian Indentation on Coating/Substrate Systems", J. Materials Res., vol. 19, No. 9, Sep. 2004, pp. 2774-2781.

* cited by examiner

SURFACE SPACING USING RIGID SPACERS

CROSS REFERENCE TO RELATED APPLICATION

This application is a continuation-in-part application of U.S. patent application Ser. No. 11/545,896, filed Oct. 11, 2006, which is hereby incorporated by reference.

FIELD OF THE INVENTION

This invention relates to devices which include surfaces that are movable with respect to each other, such as data storage devices.

BACKGROUND INFORMATION

Scanning storage devices include one or more heads, each including a tip that moves relative to a thin film storage medium. The heads and recording medium are located on wafers that are separated by a gap. Regardless of storage mechanism, the head or heads should be mechanically robust, compatible with the storage medium and provide intimate proximity to the storage medium.

One of the challenges in the probe storage area is maintaining accurate spacing between the head and storage medium wafers. In one example, the head-media wafer spacing is 15 µm with head and storage medium wafers that are 13×13 mm$^2$. Variations in this spacing could modify the contact force, angle, and position of the probe head against the storage medium wafer, thus potentially introducing noise during read and write operations, and compromising the reliability of the head and the storage medium mechanical interfacing. In addition, sensors can be embedded in the storage medium and head substrate to sense relative position of the head wafer with respect to the storage medium. Variation in the spacing between the substrates would induce noise in the sensing of the in-plane relative head-media position.

In probe storage devices that do not use micro-electromechanical system (MEMS) actuators and architecture, manufacturing tolerances are expected to result in static variations in head and storage medium spacing from device to device. The stack-up tolerances may include head and storage medium wafer thickness variation, adhesive thickness variation, and manufacturing precision of the actuator and package. These tolerances could be as large as 10 or more microns.

Vibration and shock are expected to result in dynamic changes in the head and storage medium spacing for a given device. In one example, the translation stage to which the storage medium (or the head substrate) is attached is suspended by flexible springs, which allow large linear translation motions. These springs may also allow vertical motions and tilting motions in the presence of external disturbances. Depending on the stiffness of the support springs and the direction of the external forces, the probe heads may bend or lose contact with the storage medium.

To date solutions for non-MEMS probe storage devices have focused on using high-aspect-ratio springs (e.g., having a width-to-thickness>10) to passively maintain head-to-storage medium spacing or actuators to actively control the storage medium wafer. The high-aspect-ratio springs are difficult to manufacture using conventional technology and could not easily provide the required vertical stiffness and horizontal flexibility simultaneously. Increasing out-of-plane stiffness of the support springs therefore would result in increased actuator force requirement and increased actuator power consumption. Active control of vertical translation and two axes of tilt requires additional mechanics and electronics for the actuators and control circuitry, which are prohibitive given the tight space and power budget.

There is a need for a storage apparatus that can maintain the required spacing between the head and storage medium wafers.

SUMMARY OF THE INVENTION

In a first aspect, the invention provides an apparatus including first and second surfaces separated by a gap, and a plurality of spacers defining a distance between the first and second surfaces, wherein the spacers include a curved end.

In another aspect, the invention provides an apparatus including a storage medium, a substrate separated from the storage medium by a gap, and a plurality of spacers defining a distance between the storage medium and the substrate, wherein the spacers include a curved end.

The curved end can form a portion of a spherical, cylindrical, or toroidal surface. A layer of low friction material can be positioned on the curved end of each of the spacers. The spacers can be mounted on or fabricated as an integral part of the substrate, the storage medium, or a sled supporting the storage medium. Magnets or high-voltage capacitive sensors can be used to apply a force urging the substrate toward the storage medium.

In another aspect the invention provides an apparatus including a storage medium, a substrate separated from the storage medium by a gap, a plurality of spacers defining a distance between the storage medium and the substrate, and a labyrinth seal between the spacers and a portion of the storage medium.

DETAILED DESCRIPTION

Figure 1:
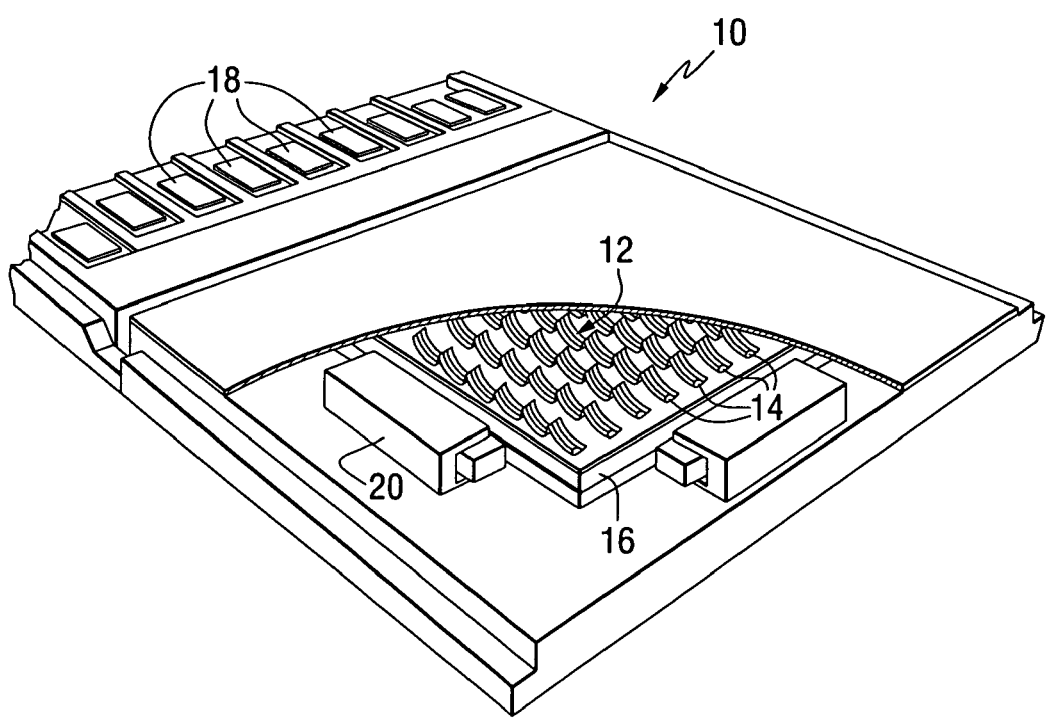
FIG. 1 is a perspective view of a probe storage array in accordance with an aspect of the present invention.

FIG. 1 is a perspective view of a probe storage device 10, which illustrates an implementation of a storage system constructed in accordance with an embodiment of the present invention. In the probe storage device 10 of FIG. 1, an array 12 of heads 14, also referred to as probes or tips, is positioned adjacent to a storage medium 16. In the configuration shown in FIG. 1 the array 14 and the medium 16 are planar and extend generally parallel with each other. The array 14 comprises a plurality of electrodes, which are operably coupled to connectors 18. The array can be mounted on a head substrate. The storage medium 16 is coupled to at least one actuator 20, which is configured to move the medium 16 relative to the array 14. This movement causes the heads to be moved relative to the individual domains on the storage medium 16. Each head can include one or more read/write elements.

Rigid spacers, also referred to as standoffs or spacers, can be used to define the head substrate-to-storage medium spacing. A minimum of three contact points, possibly on three separate spacers, is required to define the offset plane. As a substrate-level solution, spacers may be created on either the head wafer or the storage medium wafer. An illustration of this concept is shown in FIG. 2.

Figure 2:
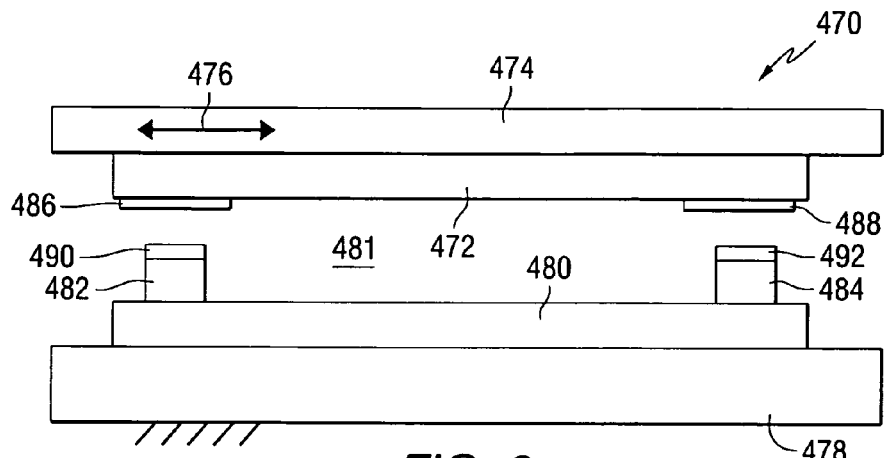
FIGS. 2 through 7 are schematic representations of alternative probe storage devices.
Figure 3:
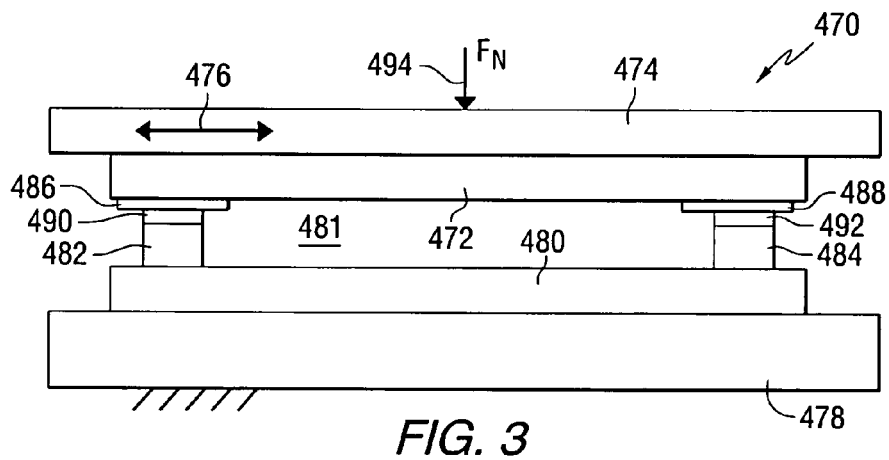

FIG. 2 is a schematic representation of a storage device 470. The device includes a storage medium 472 mounted on a sled 474 that can move as shown by arrow 476 using actuators not shown in this view. The device package 478 supports a substrate 480 and a plurality of probes mounted on the substrate but not shown in this view. A gap 481 is formed between the head substrate and the storage medium. Spacers, in the form of standoff spacers 482 and 484, are positioned in the gap and are used to define the distance between the head substrate and the storage medium. Since the heads would be mounted on the head substrate, this also defines the head-to-storage medium spacing. Layers 486, 488, 490 and 492 of low friction material are deposited on the storage medium and the tops of the spacers. In-plane motion is effectively unrestrained due to a low friction interface. As a package-level solution, the spacers may be created on the sled and the package. Other examples may include a combination of these concepts. As shown in FIG. 3, the wafers are held together with a normal force $F_N$ 494.

FIG. 2 shows MEMS spacers built on the substrate. A low-friction/low-wear material is placed between the spacers and the storage medium wafer. The low-friction/low-wear material allows unrestrained in-plane motion when the storage medium wafer contacts the spacers. A normal force is required to maintain contact between the storage medium wafer and the spacers that is sufficient to counteract operating and non-operating shock and vibration forces. The spacers may be conveniently fabricated on the head substrate. Minimal additional processing steps are required to add low friction areas on the storage medium substrate against which the spacers will glide.

FIG. 3 shows a normal force $F_N$ is supplied to urge the storage medium toward the head substrate and onto the spacers and to maintain contact between the heads and the storage medium in the face of operating and non-operating shock and vibration. In one example this normal force may be achieved through magnetic forces. The spacers may be made of a magnetic material and attracted to the opposing wafer with a permanent magnet. In another example, magnets on the storage medium sled and the package provide the attractive force. In another example, magnets on the sled and the package can provide a repulsive force that pushes the storage medium toward the head substrate. In another example, a high-voltage bias applied to capacitive position sensors results in an electrostatic force that pulls the storage medium towards the head substrate.

The spacers provide a rigid connection, which passively defines head substrate-to-storage medium spacing. MEMS processing techniques allow the spacing to be defined very accurately. The rigid connection provides both operating and non-operating vibration and shock resistance. The passive normal force would also correct any static spacing offset due to manufacturing tolerances. Because of the rigidity of the spacers, the amplitude of the force does not need to be precise. The use of magnetic material for force generation could be low cost, compact, and easily implemented.

An integrated approach, where the supporting spacers are directly fabricated on the head substrate or the storage medium, is expected to provide an accurate gap spacing because the reference surfaces are the actual substrate surfaces. Wafer thickness variation and assembly tolerances will have no effect on the gap spacing.

In a substrate-level example, all the spacers may be fabricated in a batch process, requiring no additional assembly. On the other hand, the less precise package-level example where the supporting spacers are created on the sled and the package, for example by assembly or by injection mold or other combined methods, may still potentially offer adequate gap spacing accuracy depending on the servo and signal-to-noise requirements.

Figure 4:
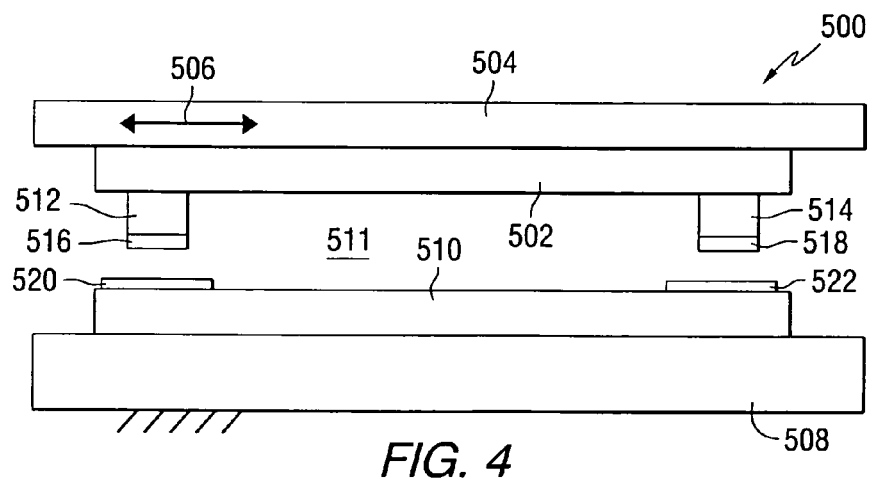

FIG. 4 is a schematic representation of a probe storage device 500. The device includes a storage medium 502 mounted on a sled 504 that can move as shown by arrow 506 using actuators not shown in this view. The device package 508 supports a substrate 510 and a plurality of probes, also referred to as heads, electrodes, or tips, not shown in this view. A gap 511 is formed between the substrate and the storage medium. Spacers, in the form of standoff spacers 512 and 514, are positioned in the gap and are used to define the head-to-storage medium spacing. Layers 516, 518, 520 and 522 of low friction material are positioned on the storage medium and the tops of the spacers. In-plane motion is unrestrained due to a low friction interface. FIG. 4 shows an example where the spacers are built onto the storage medium substrate. A low-friction/low-wear interface is maintained between the substrate, also referred to as a head wafer, and the spacers. A normal force is required to maintain contact between the spacers and the head wafer. Note that the figure is not to scale. In this case, the spacers may be added to the storage medium wafer after the intricate fabrication steps, such as sputtering or polishing, for the recording layer are completed. The storage medium wafer is then diced into the appropriate substrate sizes.

Figure 5:
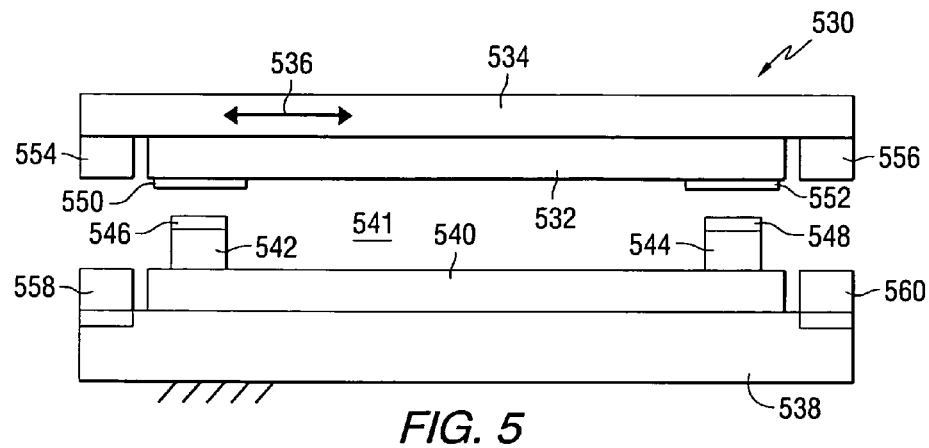

FIG. 5 is a schematic representation of a probe storage device 530. The device includes a storage medium 532 mounted on a sled 534 that can move as shown by arrow 536 using actuators not shown in this view. The device package 538 supports a substrate 540 and a plurality of probes, not shown in this view. A gap 541 is formed between the substrate and the storage medium. Spacers, in the form of standoff spacers 542 and 544, are positioned in the gap and are used to define the head-to-storage medium spacing. Layers 546, 548, 550 and 552 of low friction material are positioned on the storage medium and the tops of the spacers. In-plane motion is unrestrained due to a low friction interface. FIG. 5 shows an embodiment where the spacers are built on the substrate. A low-friction/low-wear interface is maintained between the head wafer and the spacers. A normal force is required to maintain contact between the spacers and the head wafer. In FIG. 5, permanent magnets 554, 556, 558 and 560 attached to the storage medium sled and the package are used to provide the normal force.

In FIG. 5, the spacers are built onto the substrate and the normal force is generated via permanent magnets attached to the storage medium sled and the package. In this embodiment, the magnet (or ferromagnetic material) attached to the moving sled should be very lightweight, in order to achieve high bandwidth actuation of the sled. The bulk of the magnetic force may come from the magnets attached to the package, which have less mass or volume constraints.

Figure 6:
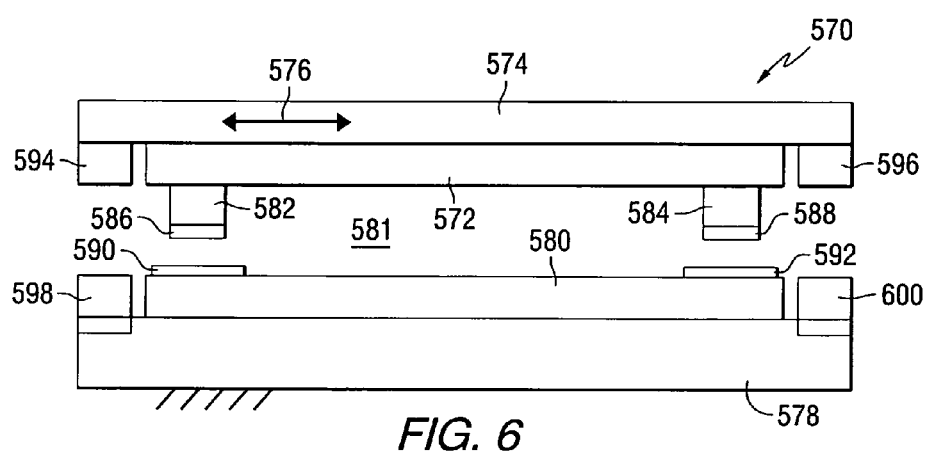

FIG. 6 is a schematic representation of a probe storage device 570. The device includes a storage medium 572 mounted on a sled 574 that can move as shown by arrow 576 using actuators not shown in this view. The device package 578 supports a head substrate 580 and a plurality of probes, not shown in this view. A gap 581 is formed between the substrate and the storage medium. Spacers, in the form of standoff spacers 582 and 584, are positioned in the gap and are used to define the head-to-storage medium spacing. Layers 586, 588, 590 and 592 of low friction material are positioned on the storage medium and the tops of the spacers. In-plane motion is unrestrained due to a low friction interface. FIG. 6 shows an embodiment where the spacers are built on the head substrate. A low-friction/low-wear interface is maintained between the head wafer and spacers. A normal force is required to maintain contact between the spacers and the head wafer. In FIG. 6, permanent magnets 594, 596, 598 and 600 attached to the storage medium sled and the package are used to provide the normal force.

In FIG. 6 MEMS spacers are built on the storage medium wafer. A low-friction/low-wear interface is maintained between the storage medium wafer and spacers. Again, the normal force is generated via permanent magnets attached to the storage medium sled and the package.

In FIG. 6, the magnets (or ferromagnetic material) attached to the moving sled should be very lightweight, in order to achieve a high bandwidth actuator of the sled. The bulk of the magnet force may come from the magnets attached to the package, which have less mass or volume constraints.

Figure 7:
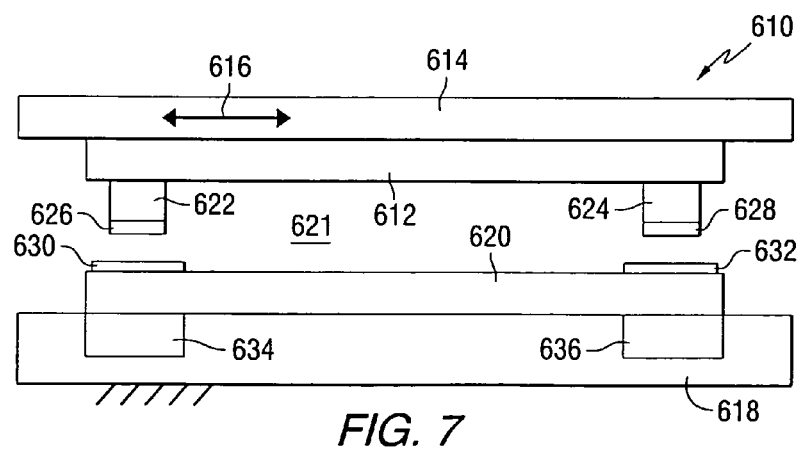

FIG. 7 is a schematic representation of a probe storage device 610. The device includes a storage medium 612 mounted on a sled 614 that can move as shown by arrow 616 using actuators not shown in this view. The device package 618 supports a substrate 620 and a plurality of probes, not shown in this view. A gap 621 is formed between the substrate and the storage medium. Spacers, in the form of standoff spacers 622 and 624, are positioned in the gap and are used to define the head-to-storage medium spacing. Layers 626, 628, 630 and 632 of low friction material are positioned on the storage medium and the tops of the spacers. In-plane motion is unrestrained due to a low friction interface. FIG. 7 shows an embodiment where the spacers are built on the storage medium substrate. A low-friction/low-wear interface is maintained between the head wafer and spacers. A normal force is required to maintain contact between the spacers and the head wafer. In FIG. 7, permanent magnets 634 and 636 are attached to the package to provide the normal force. The normal force is generated via the interaction between a permanent magnet embedded into the package beneath the substrate and the spacers themselves. The spacers can also be made out of a magnetic material.

The spacers on the storage medium substrate in this case are made out of a magnetic material that becomes attracted to the embedded magnet on the package. Additional magnets may be embedded in the storage medium sled to increase the attractive force.

Figure 8A:
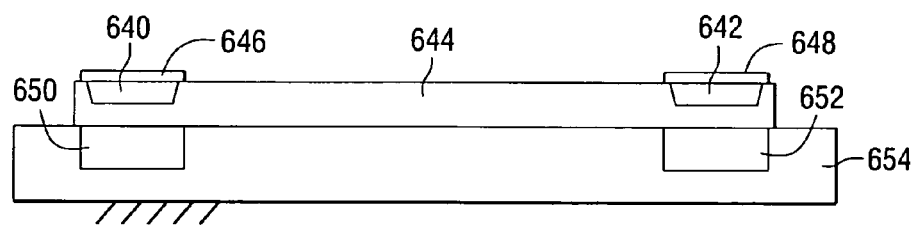
FIGS. 8a, 8b, 8c and 8d show alternative magnet mounting assemblies.

In an alternative example, ferromagnetic material may be embedded inside either the storage medium or substrate to increase the magnet force. For example, if the head wafer is made of silicon, cavities on the head substrate may be created using anisotropic or isotropic etching techniques. The cavity may be created on the backside of the substrate. FIGS. 8a, 8b, 8c and 8d show various examples of this construction. In FIG. 8a, magnetic material 640 and 642 is embedded in the substrate 644 below a layer of low friction material 646 and 648. Additional magnetic material 650 and 652 is embedded in the package 654.

Figure 8B:
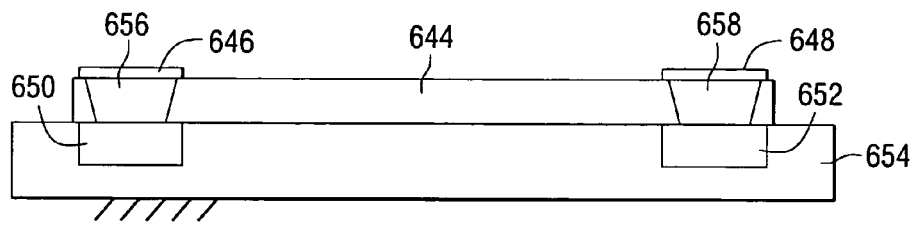
Figure 8C:
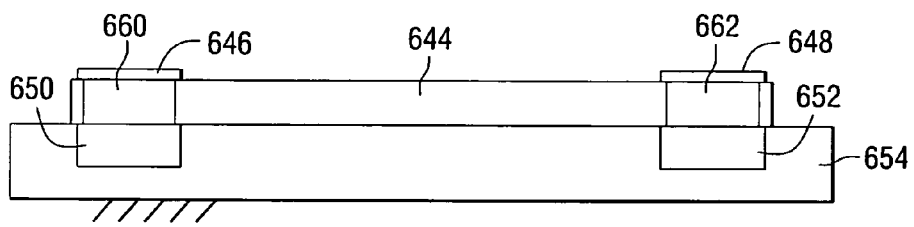
Figure 8D:
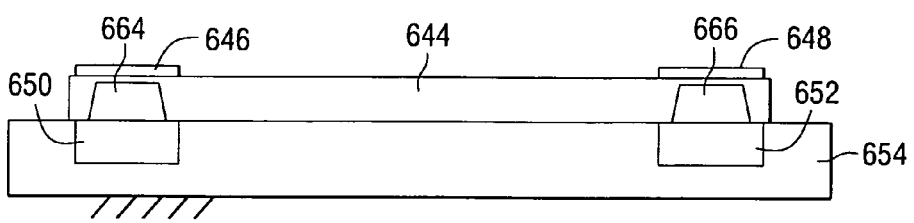

In FIGS. 8b and 8c, the magnetic material 656, 658, 660 and 662 is embedded in deeper cavities. FIG. 8d shows that the magnetic material 664 and 666 may protrude from the package into the substrate, reducing its distance from the mating spacers. The magnet in this case may also serve as an alignment feature for substrate and package assembly.

Figure 9:
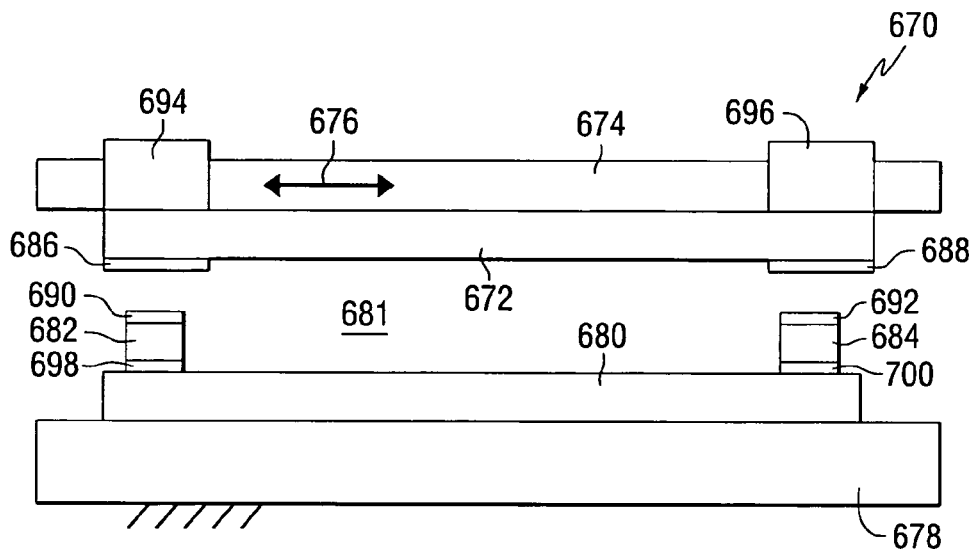
FIG. 9 is a schematic representation of a probe storage device.

In another example the spacers are built onto the substrate and the normal force is generated via a permanent magnet embedded in the storage medium sled. FIG. 9 is a schematic representation of an embodiment of a probe storage device 670. The device includes a storage medium 672 mounted on a sled 674 that can move as shown by arrow 676 using actuators not shown in this view. The device package 678 supports a substrate 680 and a plurality of probes, not shown in this view. A gap 681 is formed between the substrate and the storage medium. Spacers, in the form of standoff spacers 682 and 684, are positioned in the gap and are used to define the head-to-storage medium spacing. Layers 686, 688, 690 and 692 of low friction material are positioned on the storage medium and the tops of the spacers. In-plane motion is unrestrained due to a low friction interface. FIG. 9 shows an embodiment where the spacers are built on the substrate. A low-friction/low-wear interface is maintained between the head wafer and spacers. A normal force is required to maintain contact between the spacers and the head wafer. In FIG. 9, permanent magnets 694 and 696 are attached to the sled to provide the normal force.

The spacers are made out of a magnetic material and become attracted to the embedded magnet. The normal force is generated via the interaction between a permanent magnet embedded into the storage medium sled and the spacers themselves. Additional magnets may be embedded in the package to increase the attractive force.

A damping material 698 and 700 can be placed between the spacers and the head substrate to reduce high frequency vibration. The damping material in this configuration, which could be a polymer, must be very stiff to obtain rigid spacing. The order of the stack of material layers in the spacers may depend on the ease of fabrication.

Figure 10:
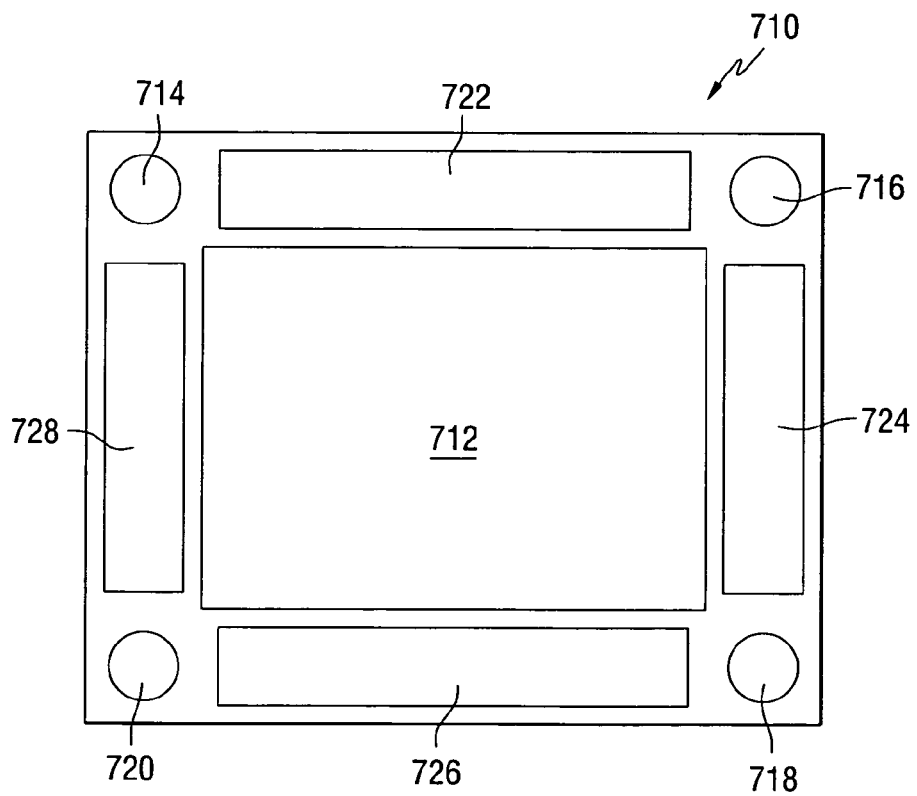
FIG. 10 is a plan view of a substrate and associated spacers and sensors.

FIG. 10 is a plan view of a head wafer layout 710. The wafer 712 is expanded in each direction to accommodate the support structure, which comprises magnetic spacers 714, 716, 718 and 720. Capacitive sensors 722, 724, 726 and 728 can be built on the support extension in areas in which the spacer is not needed.

The spacers are located along the border of the head (or storage medium) wafer. The border of the head (or storage medium) wafer, which may not be available to store data, may be used to accommodate not only the magnets and spacers, but also position sensors. In order to maximize the signal-to-noise ratio (SNR) of the sensors, the capacitive sensor electrodes may be built on the top of a spacer structure so that the gaps between the electrodes on the head and storage medium wafers are equal to or smaller than the desired head-to-storage medium spacing. The sensor posts could be fabricated simultaneously with the mechanical standoff posts. As a result, it is possible to trade-off the amount of wafer extension versus the post length and capacitive sensor area. The capacitive sensors may be built in the areas not occupied by the posts.

In one design example, the holding force is chosen to resist operating shock and vibration forces. It is desired that the holding force be greater than 0.4 N, which is the force required to resist 200 G acceleration with 200 mg mass. It is assumed that non-operating shock will be handled with separate bumpers. Magnets (e.g., NdFe35) can be embedded in both the package and the storage medium sled and through the storage medium and head wafers. The spacer can be constructed of iron. The head and storage medium wafers can be silicon. The width of the spacer and the width of the magnet can be 200 μm and 500 μm respectively. The height of the magnet can be 800 μm, allowing the magnet to fit inside the package.

Figure 11:
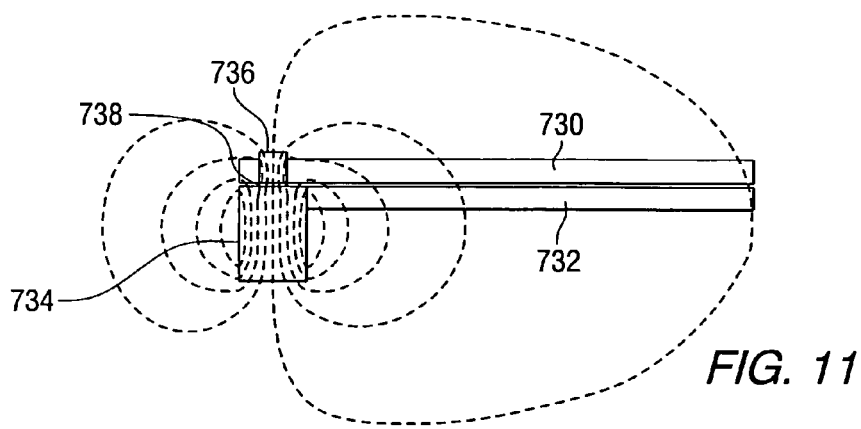
FIG. 11 is a schematic representation of a portion of a probe storage device showing a magnetic field produced in a simulation.

FIG. 11 is a schematic representation of a portion of a probe storage device showing a magnetic field produced in a simulation. Item 730 represents the storage medium wafer and item 732 represents the head wafer. Item 734 represents a magnet embedded in the package that extends through the head wafer. Item 736 represents a magnet embedded in the storage medium sled that extends through the storage medium wafer. Item 738 represents an iron spacer built onto the head wafer.

For this geometry/material combination, a holding force of 80 N/m is generated. Therefore, to achieve 0.4 N of force, the spacer must be 5 mm deep. An example layout is shown in FIG. 10. The head wafer is extended by 1 mm in each direction. Spacers are built around the extended corners with a combined length of 5 mm. A spacer and a magnet can be placed at each of the four corners of the rectangular substrate.

The spacer interface surfaces may be covered with low friction coating such as Teflon having a coefficient of friction of 0.05 to 0.2, or diamond-like carbon (DLC) coating having a coefficient of friction of 0.05 to 0.15, or as low as 0.003-0.008 at low sliding speed. The lowest achievable coefficient of friction will depend on the final choice of lubrication, scan and seek speed, and packaging environment.

Given a total normal force of 0.4 N, and assuming a spacer coefficient of friction of 0.03, then the drag force parallel to the plane of the sled due to the spacer contact surfaces will be 12 mN. Depending on the actuator design, this may be a significant force. If it is, the force requirement may be relaxed to cover only operating vibration with bumpers correcting operating and non-operating shock.

Figure 12:
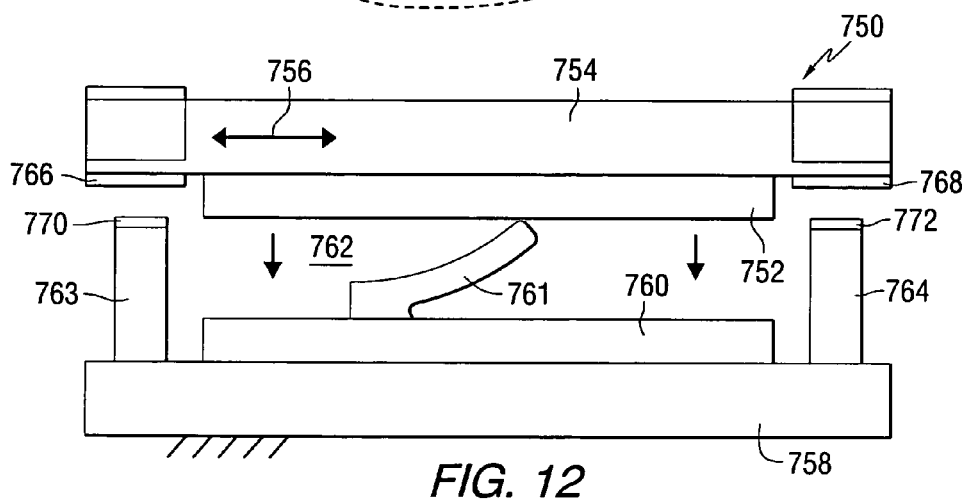
FIGS. 12 through 14 are schematic representations of alternative probe storage devices.

FIG. 12 is a schematic representation of a storage device 750. The device includes a storage medium 752 mounted on a sled 754 that can move as shown by arrow 756 using actuators not shown in this view. The device package 758 supports a head substrate 760 and a plurality of probes, for example probe 761. A gap 762 is formed between the head substrate and the storage medium. Spacers, in the form of standoff spacers 763 and 764, are positioned in the gap and are used to define the head-to-storage medium spacing. Layers 766, 768, 770 and 772 of low friction material are positioned on the storage medium and the tops of the spacers. In-plane motion is unrestrained due to a low friction interface.

In the example of FIG. 12, the spacers are located on the package while magnets are embedded in the sled, with low-friction/low-wear contact surfaces between the spacer and the sled. While this package-level embodiment may not achieve the same accuracy in terms of parallelism and spacing as the substrate-level embodiment, it is still a viable solution, since it offers flexibility in terms of size and material choices of the rigid spacers or posts, which do not have to be compatible with the head substrate. Furthermore, the full real estate of the storage medium may now be dedicated to data recording.

Figure 13:
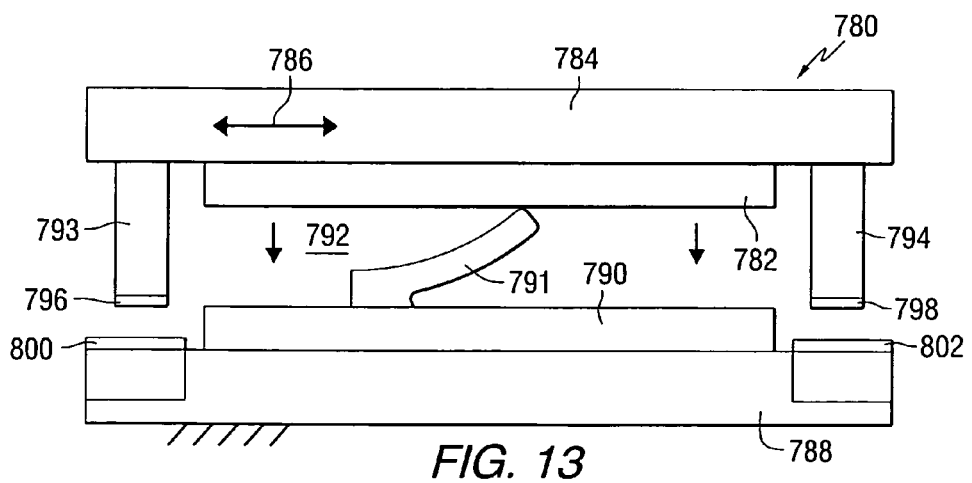

FIG. 13 is a schematic representation of a probe storage device 780. The device includes a storage medium 782 mounted on a sled 784 that can move as shown by arrow 786 using actuators not shown in this view. The device package 788 supports a substrate 790 and a plurality of probes, for example probe 791. A gap 792 is formed between the substrate and the storage medium. Spacers, in the form of standoff spacers 793 and 794, are positioned in the gap and are used to define the head-to-storage medium spacing. Layers 796, 798, 800 and 802 of low friction material are positioned on the storage medium and the tops of the spacers. In-plane motion is unrestrained due to a low friction interface.

In the example of FIG. 13, the spacers are located on the sled while magnets are embedded in the bottom package to which the substrate is attached, with low-friction/low-wear contact surfaces between the spacer and the package. The main benefit of this approach is that if wearing occurs on the sliding surfaces and substantial particles are generated due to the choice of sliding surfaces, these particles may easily be contained by defining surrounding hubs around the spacer or by creating adhesive traps near the spacers since the wearing surfaces are not coplanar with the recording surface. There is also less constraint on the size and location of the spacers and magnets, and the mass of the moving components is smaller than in the device of FIG. 11.

Figure 14:
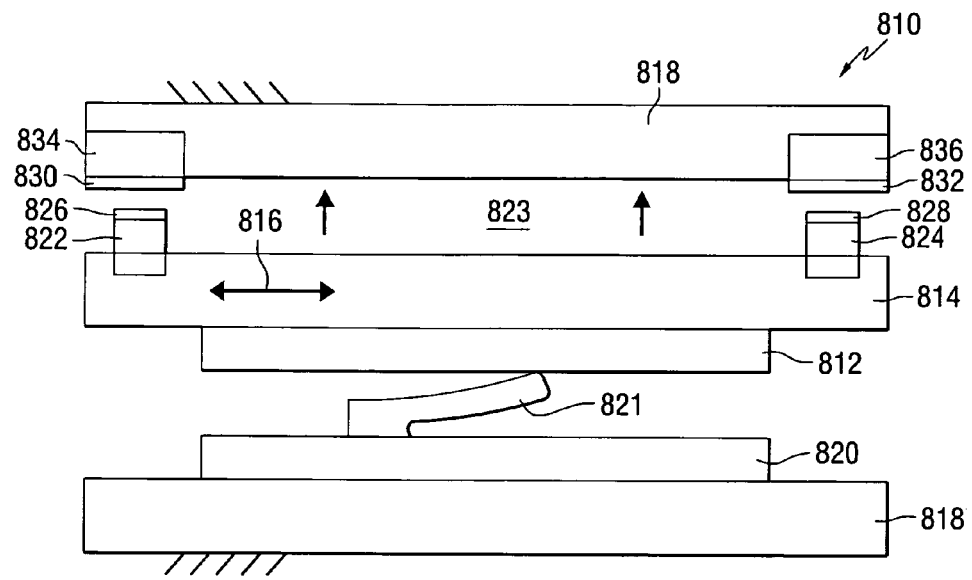

FIG. 14 is a schematic representation of a probe storage device 810. The device includes a storage medium 812 mounted on a sled 814 that can move as shown by arrow 816 using actuators not shown in this view. The device package 818 supports a substrate 820 and a plurality of probes, for example probe 821. In this example, the package 818 forms a gap 823 with the sled. Spacers, in the form of standoff spacers 822 and 824, are positioned in the gap and are used to define the head-to-storage medium spacing. Layers 826, 828, 830 and 832 of low friction material are positioned on the storage medium and the tops of the spacers. Magnets 834 and 836 are embedded in the package. In-plane motion is unrestrained due to a low friction interface.

In FIG. 14, the spacers are located on the sled while magnets are embedded in the top cover of the package, with low-friction/low-wear contact surfaces between the spacer and the sled. The main benefit of this approach is that if wearing occurs on the sliding surfaces and substantial particles are generated due to the choice of sliding surfaces, these particles may easily be contained by defining surrounding hubs around the spacer or by creating adhesive traps near the spacers since there is ample free space between the sled and the top package. There is also less constraint on the size and location of the spacers and magnets.

Figure 15:
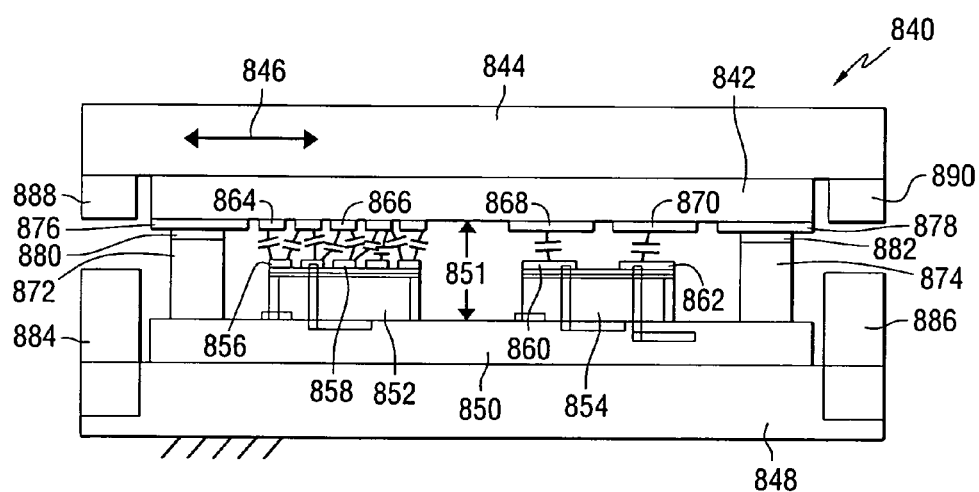
FIG. 15 is a schematic representation of a probe storage device including elevated electrodes in combination with gliding spacers and magnets to achieve precise gap control.

FIG. 15 is a schematic representation of a probe storage device 840. The device includes a storage medium 842 mounted on a sled 844 that can move as shown by arrow 846 using actuators not shown in this view. The device package 848 supports a substrate 850 and a plurality of probes, not shown in this view. A gap 851 is formed between the substrate and the storage medium. A plurality of spacers 852 and 854 are positioned in the gap. Layers, for example 856, 858, 860 and 862, of low friction material are positioned on the storage medium and the tops of the spacers. In-plane motion is unrestrained due to a low friction interface. Electrodes mounted on the spacers 852 and 854 form capacitors with electrodes mounted (for example 864, 866, 868 and 870) on the storage medium. Standoff spacers 872 and 874 in combination with low friction layers 876, 878, 880 and 882, define the head-to-storage medium spacing. Magnets 884, 886, 888 and 890 are used to provide the normal force. Elevated electrodes for capacitive sensing are implemented in combination with gliding spacers and magnets to achieve precise gap control.

Capacitive sensor electrodes 864, 866, 868 and 870 are built onto the head and storage medium wafers. In the embodiment shown in FIG. 15, the electrodes are located on elevated planes resting on a rigid spacer structure 352 and 354. The planes may be made of a single insulating layer or multiple layers with embedded shields to shield the bottom side of the electrodes. The electrode signal goes through the insulating layer via conductors. Electrically conductive shields can be provided such that the signal travels to the substrate via a shielded connection. The signal path to the substrate can be surrounded by an insulating layer, which is in turn surrounded by grounded signal shields.

The shielded post structures can be posts whose outer wall is made of metal, with the inside core made of an alternative material. This composite post concept is beneficial for creating thick solid post supports without compromising plating time or plating uniformity.

Figure 16:
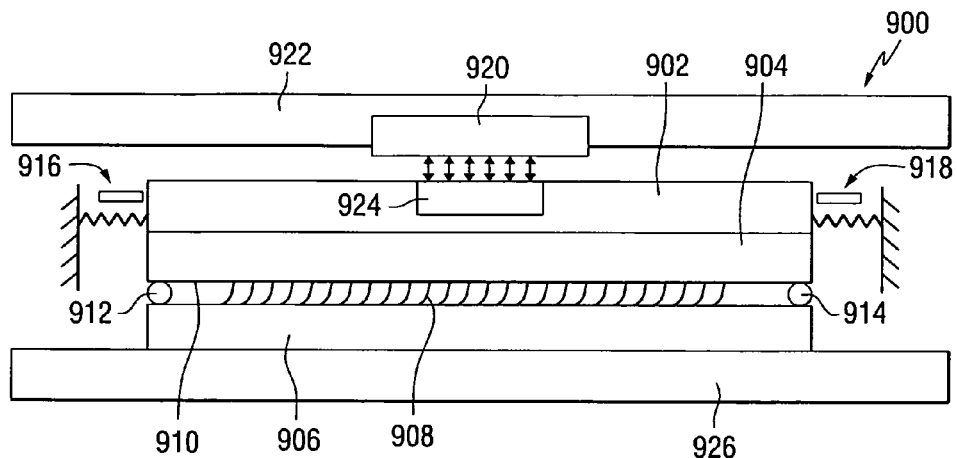
FIG. 16 is a schematic representation of an alternative probe storage device.

FIG. 16 is a side view of another aspect of the invention. FIG. 16 shows a storage device 900 including a sled 902 that supports a storage medium substrate 904 and a head substrate 906. The head substrate supports a plurality of heads 908 that contact a storage medium 910 on the storage medium substrate. The storage medium substrate 904 and the substrate 906 are separated by spacers in the form of pins 912 and 914. Actuators 916 and 918 are provided to move the storage medium with respect to the heads. A first magnet 920 is mounted on a case top 922. A second magnet 924 is mounted on the sled. The first and second magnets are arranged to repel each other, thereby causing a normal force on the sled that forces the sled toward the substrate. The substrate is supported by a case bottom 926.

FIG. 16 shows an example in which the spacers are built into the substrate. The spacers are shown as pin-like spacers in FIG. 17 and the contacting surface on the storage medium can be coated with a thin film of low-friction and wear-resistant material such as diamond-like carbon (DLC) or $MoS_2$.

A normal force is required to maintain contact between the storage medium wafer and the spacers that is sufficient to counteract operating and non-operating shock and vibration forces. In the example of FIG. 16, the normal force is produced using magnets 920 and 924 in a repelling configuration. The repelling magnets are attached to the sled and case top.

In the example of FIG. 16, MEMS spacers are built on the substrate. The spacers and corresponding contacting surface on the storage medium are coated with a low-friction and wear-resistant coating such as diamond-like carbon. A normal force is supplied to lower the storage medium onto the spacers and maintain contact between the heads and the storage medium in the face of operating and non-operating shock and vibration using a pair of repelling magnets.

Figure 19:
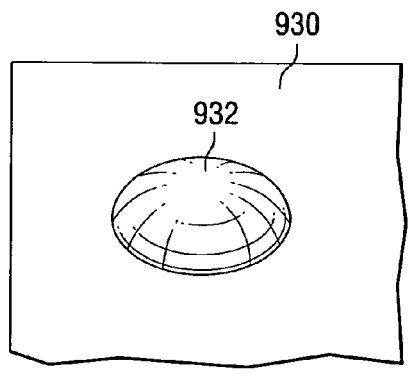
FIGS. 19, 20 and 21 are schematic representations of alternative spacer configurations.
Figure 20:
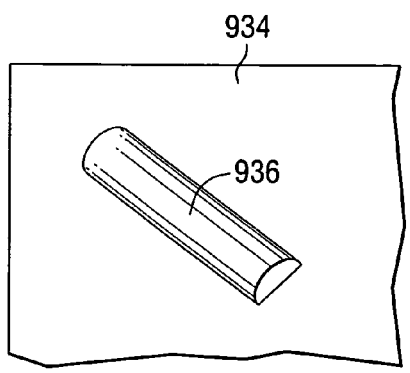
Figure 21:
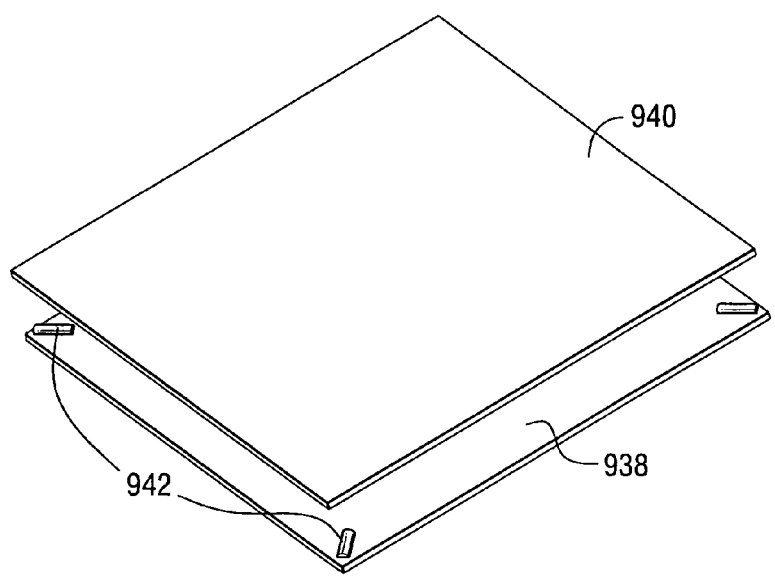

The spacers themselves can have various designs. Some examples are illustrated in FIGS. 19, 20 and 21. The geometry of the contacting surface of the spacer and the mating surface, as well as the materials for the substrate and any coating for the two contacting surfaces may take a variety of forms. For the case of cylindrical spacers (FIGS. 21 and 22) with 100 nm thick DLC coating on the spacer and the mating surface on the storage medium, a static coefficient of static friction of 0.145 has been predicted based on analytical modeling. The depth of wear of the spacers over a billion sliding cycles is estimated to be about 20 nm.

An example of a design of the spacer based on an analytical model for friction and wear at the contact interface is presented below. In this design example, the holding force is only intended to counteract operating vibration, and spacers are assumed to correct operating and non-operating shock. Assuming an estimated total mass of 230 mg for the storage medium-sled assembly and assuming a 12 g operating vibration requirement, the storage medium needs to be clamped against the spacers with a total force of 27.4 mN.

One example meeting the clamping force requirement includes a magnet with a diameter of 4 mm and a thickness of 0.25 mm, mounted on the top case, and a magnet 2.30 mm in diameter and 0.20 mm thick mounted at the center of the sled. The separation between the magnets would be 0.15 mm. The magnet material is assumed to have an energy product of 50 MGOe. The clamping force and forces on the sled in the plane of the sled have been computed numerically and presented in FIGS. 17 and 18. The variation of clamping force $F_z$ shown in FIGS. 17 and 18 varies by less than 10% across the range of motion of the sled. The resultant variation in friction force can be easily compensated by a servo-controller.

Figure 17:
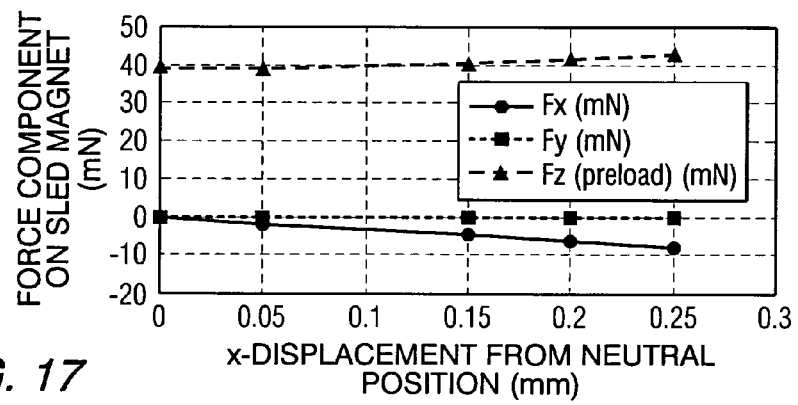
FIGS. 17 and 18 are graphs of magnetic force components and in-plane force with displacement of the sled relative to the head substrate.
Figure 18:
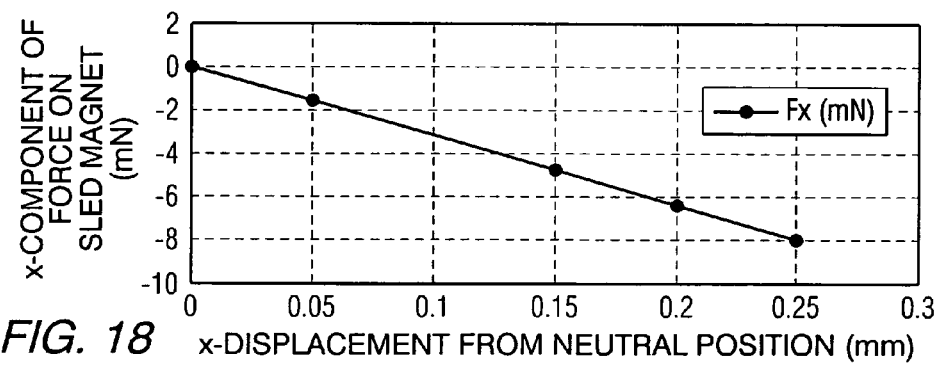

FIG. 17 shows a variation of clamping force with in-plane displacement of the sled. FIG. 18 shows a variation of in-plane restoring force with in-plane displacement of the sled. Motion of the sled relative to the magnet on the top case results in a restoring force. The magnets therefore act like a nonlinear spring with varying stiffness across the stroke of the sled. By proper design of the magnet diameters, this stiffness can be adjusted to lie within a desirable range and the variation of the restoring force can be made to vary linearly over the stroke of the sled. This idea can be used to eliminate the flexures attached to the sled for overcoming linear shock and vibration. FIG. 18 shows a linear variation of the in-plane force with displacement of the sled with respect to the case magnet, from the neutral position wherein the axes of the magnets are aligned.

The spacers can be designed to have various profile geometries depending on the desired friction and wear characteristics for the sliding contact interface, the materials chosen for spacer and the mating surface, the required normal force for clamping, and constraints on capabilities for fabrication of the spacers. Three possible types of spacers and sliding contact mechanisms for passive spacing control between the head and storage medium substrates are shown in FIGS. 19, 20 and 21. The spacers in each of these examples include a curved end that can form a portion of a spherical or cylindrical surface.

FIG. 19 shows a substrate 930 having a spacer 932 with a spherical curvature. The spacer can be, for example, semispherical structures mounted on the substrate. A plurality of such standoffs can be positioned on the head substrate.

FIG. 20 shows a substrate 934 having a cylindrical spacer 936 for passive z-control of storage medium-head substrate separation. The spacer can be, for example, a semi-cylindrical structure mounted on the head substrate. In FIG. 20, the semi-cylindrical spacers lies on axes that are inclined at about a 45° angle with respect to the edges of the sled. A plurality of such spacers can be positioned on the substrate.

FIG. 21 shows a substrate 938 and a storage medium substrate 940 having a plurality of spacers 942, each having a cylindrical surface, on storage medium and substrates for passive z-control.

The spacers in FIGS. 19 and 20 can be either on the storage medium or the substrate, and can include an end that forms a portion of a spherical or cylindrical surface. The spacers and the corresponding mating surface can both be coated with thin films of low-friction materials such as $MoS_2$ and diamond-like carbon (DLC).

Using the example in FIG. 21, based on analytical modeling of friction and wear at the contact interface, the influence of geometry of the spacer on the wear-life and friction characteristics can be studied and a design point picked suitably.

The embodiment of FIG. 21 includes four cylindrical standoffs arranged near the corners of the substrate. The storage medium surface is preloaded against the standoff surfaces. In modeling the contact problem with the cylindrical standoffs, the standoffs and the mating contact area on the storage medium were assumed to be made of sapphire. Both contact surfaces are assumed to be coated with a 100 nm thick film of DLC. In modeling the friction and wear characteristics of the sliding interface, the contact was assumed to be elastic and Hertzian.

In computing the friction coefficient and wear metrics for the interface between the bilayered material (e.g., sapphire substrate coated with DLC), a computed value of equivalent elastic modulus for the bilayered material was used. The hardness of the bilayered material was assumed to be 20 GPa based on results described by others for the case of nano-indentation of 100 nm DLC films. An equivalent yield strength of the interface was then calculated and used as the threshold value in the local-yielding-based determination of static friction.

Figure 22:
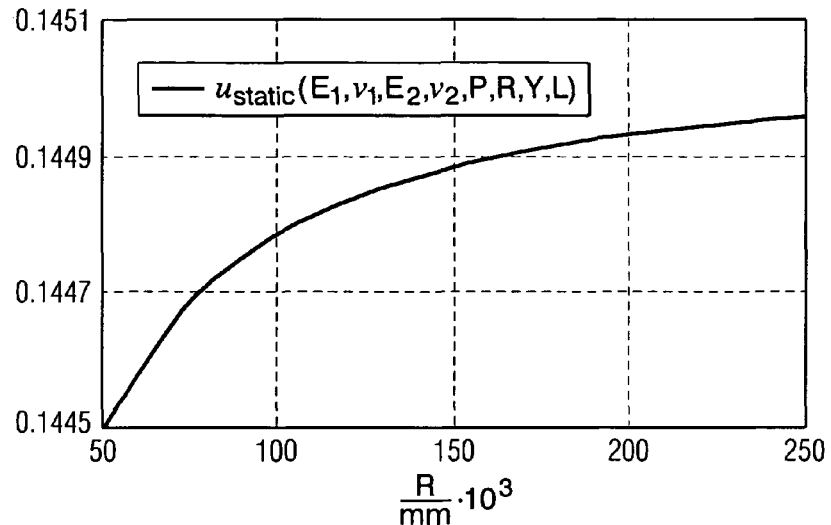
FIG. 22 is a graph of coefficient of friction versus spacer radius. The range of radius of curvature of the spacer is chosen to minimize sensitivity to fabrication tolerances in the spacer geometry.

FIG. 22 shows a coefficient of static friction for DLC-coated cylindrical spacers. FIG. 22 shows the variation of the static coefficient of friction at the interface with radius of curvature of the cylindrical spacers, for spacers having a length of 0.70 mm. In this case, the range of radius of curvature of the cylindrical spacers is chosen so as to minimize sensitivity of friction coefficient to manufacturing tolerances on the part geometry. While the friction coefficient can be significantly reduced by reducing the radius of curvature sufficiently enough, this would at the same time result in increased wear. The geometry of the spacers is therefore chosen so as to optimize both wear and friction.

Figure 23:
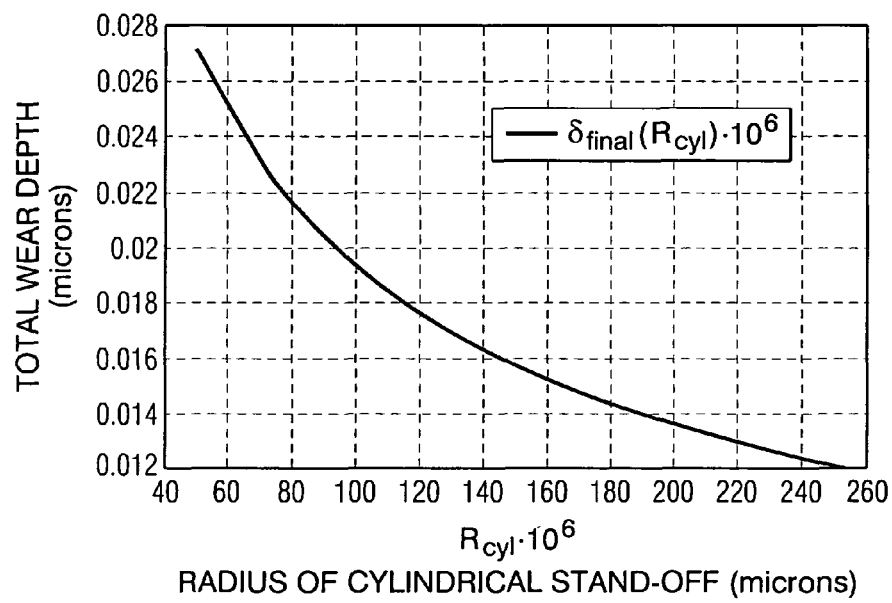
FIG. 23 is a graph of wear depth versus spacer radius. The spacer geometry is chosen so as to optimize both wear and friction.

An iterative algorithm that recomputes the contact zone area and the mean Hertzian pressure at the interface has been used to compute the wear volume and wear depth in steps. FIG. 23 shows the depth to which the spacer wears after a billion sliding cycles for a range of radii of the cylindrical spacer. These calculations assume a length of 0.70 mm for the spacers.

Based on the predictions of friction coefficient and wear depth, a suitable design point could, for instance, be chosen as a radius of 250 microns and a length of about 1 mm for the spacers with a cylindrical profile, with both contact surfaces coated with 100 nm thick film of DLC. The coefficient of static friction for this case is predicted to be about 0.145 and the depth of wear of the spacers over a billion sliding cycles is estimated to be about 20 nm.

Figure 24:
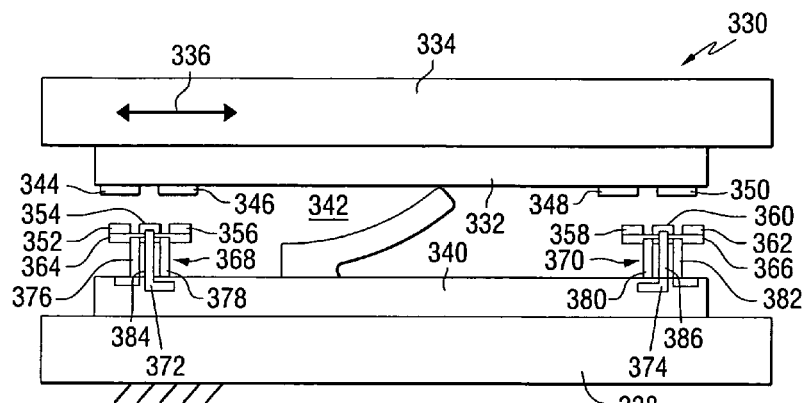
FIG. 24 is a schematic representation of another probe storage device.

FIG. 24 is a schematic representation of a probe storage device 330. The device includes a storage medium 332 mounted on a sled 334 that can move as shown by arrow 336 using actuators not shown in this view. The device package 338 supports a substrate 340 and a plurality of probes, not shown in this view. A gap 342 exists between the storage medium and the substrate. Capacitive sensor electrodes 344, 346, 348, 350, 352, 354, 356, 358, 360 and 362 are built onto the head and storage medium wafers. In the embodiment shown in FIG. 24, the electrodes are located on elevated planes 364 and 366 resting on a rigid spacer structure 368 and 370. The planes may be made of a single insulating layer or multiple layers with embedded shields to shield the bottom side of the electrodes. The electrode signal goes through the insulating layer via conductors 372 and 374. Electrically conductive shields 376, 378, 380 and 382 are provided such that the signal travels to the head substrate via a shielded connection. The signal path to the substrate is surrounded by an insulating layer 384 and 386, which is in turn surrounded by grounded signal shields.

The shielded post structures are posts whose outer wall is made of metal, with the inside core made of an alternative material. This composite post aspect is beneficial for creating thick solid post supports without compromising plating time or plating uniformity.

When the device includes both a capacitive sensor and spacers, a normal force can be applied to clamp the storage medium against the spacers by applying a sufficiently high DC voltage across the electrodes of the capacitive sensor. The primary purpose of the capacitive sensor is for position sensing of the storage medium relative to the probe substrate. However, the capacitive sensor can be used in a dual-role, i.e., for position sensing and clamping the storage medium against the spacers with enough force to overcome operating vibration and shock and maintain the separation between storage medium and head substrate during these events.

The normal clamping force can be produced by applying a DC voltage across electrodes of capacitive sensors to generate the clamping force. The clamp force generated by the capacitive sensors when a DC voltage $V_{appl}$ is applied across the electrodes is given by $$F_z = \frac{1}{2} \cdot \varepsilon_0 \cdot V_{appl}^2 \cdot \frac{A}{d^2} \cdot N_{sensors}.$$

A voltage of 150 V across the electrodes separated by a 3 micron-gap would produce a clamping force of around 34 mN, sufficient to overcome operating vibration and shock of 12 g amplitude. By coating the electrodes with a dielectric coating and/or reducing the spacing between the electrodes, the force density can be increased further, thereby reducing the required DC voltage. A 0.25 micron coating of $TiO_2$ over the electrodes and a physical gap of 2.5 microns between the electrodes would require a reduced voltage of 110 V across the electrodes to provide the required clamping force. The high DC voltage can be obtained using charge pumps or voltage step-up transformers that can be implemented on an integrated circuit.

Figure 25:
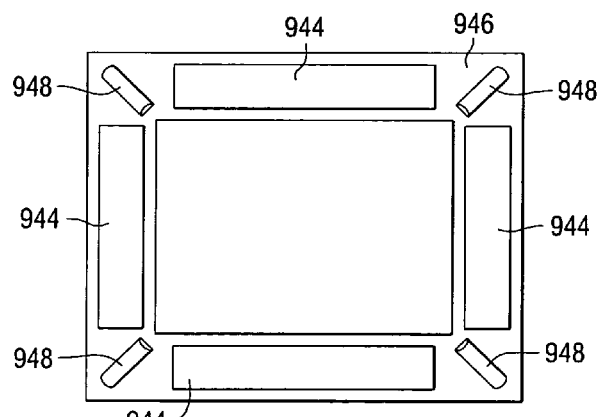
FIG. 25 is a plan view of a head substrate and associated spacers.

FIG. 25 shows a layout of capacitive sensing electrodes 944 and spacers on a head substrate 946, with cylindrical standoffs 948 near the corners of the substrate.

Figure 26:
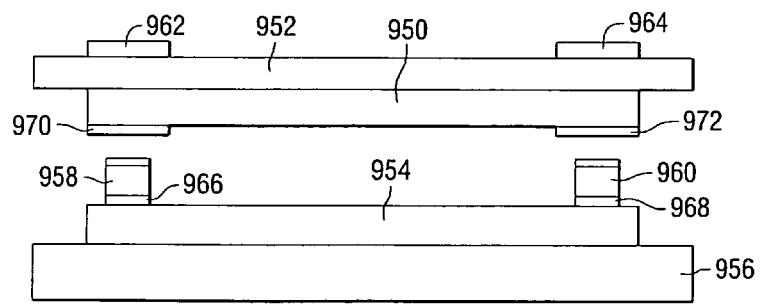
FIGS. 26 through 31 are schematic representations of alternative probe storage devices.

Another example is shown in FIG. 26. In FIG. 26, a storage medium 950 is mounted on a sled 952 and a substrate 954 is mounted on a package 956. Spacers 958 and 960 are built onto the substrate 954 and the normal force is generated via permanent magnets 962 and 964 embedded in the storage medium sled 952. The spacers are made out of a magnetic material that becomes attracted to the embedded magnet. A damping material 966 and 968 is placed between the spacers and the substrate to reduce high frequency vibration. The damping material in this configuration, which could be a polymer, must be very stiff to obtain rigid spacing. The order of the materials in the spacer stacks may depend on the ease of fabrication. Additional magnets may be embedded in the package to increase the attractive force.

A low-friction/low-wear interface 970 and 972 is maintained between the storage medium wafer and spacers. The normal force can be generated via the interaction between a permanent magnet embedded into the storage medium sled and the spacers themselves. The spacers can be made out of a magnetic material. A high stiffness damping material is placed between the substrate and the spacers. Additional magnets may be embedded in the package to increase the attractive force.

Figure 27:
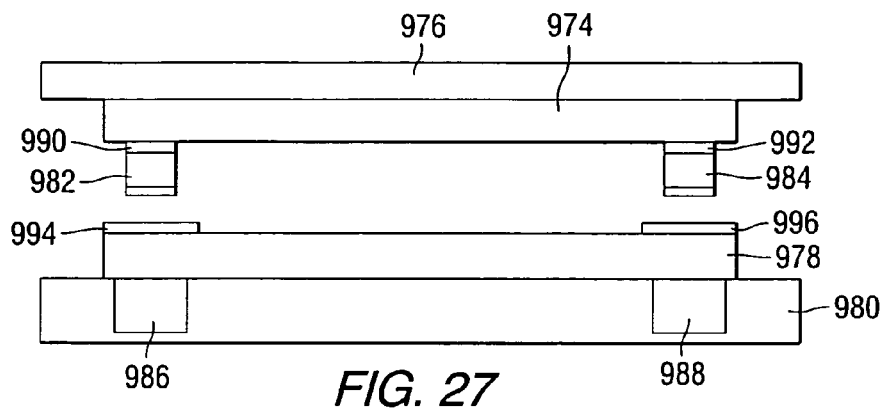

Another example is shown in FIG. 27. In FIG. 27, a storage medium 974 is mounted on a sled 976 and a substrate 978 is mounted on a package 980. Spacers 982 and 984 are built onto the storage medium substrate and the normal force is generated via permanent magnets 986 and 988 embedded in the package. The spacers are made out of a magnetic material that is attracted to the embedded magnets. Similar to FIG. 26, a damping material 990 and 992 is placed between the spacers and the storage medium substrate to reduce high frequency vibration. The damping material in this configuration must be very stiff to obtain rigid spacing. Additional magnets may be embedded in the storage medium sled to increase the attractive force.

FIG. 27 shows spacers that are built on the storage medium substrate. A low-friction/low-wear interface 994 and 996 is maintained between the head wafer and spacers. The normal force is generated via the interaction between a permanent magnet embedded into the package and the spacers themselves.

Figure 28:
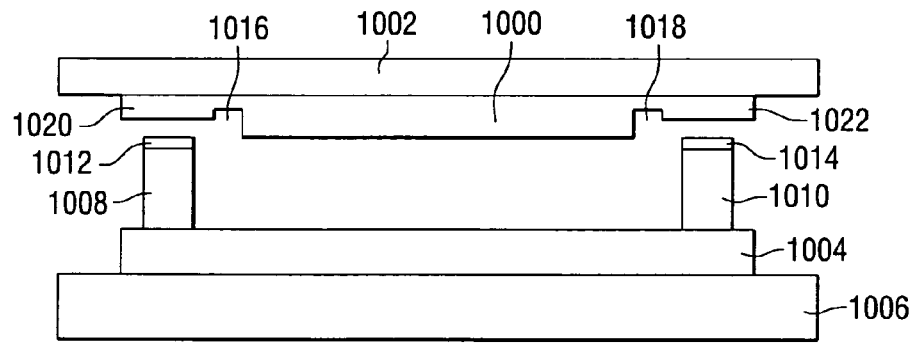

Another example is shown in FIG. 28. In FIG. 28, a storage medium 1000 is mounted on a sled 1002 and a substrate 1004 is mounted on a package 1006. Spacers 1008 and 1010 are built on the substrate. A low-friction/low-wear interface 1012 and 1014 is maintained between the storage medium wafer and spacers. A normal force is required to maintain contact between the spacers and the storage medium wafer.

In this example, the support spacers may be conveniently fabricated on the substrate. Minimal additional processing steps are required to create recesses 1016 and 1018 in the storage medium substrate and to add low friction areas 1020 and 1022 on the storage medium substrate against which the spacers will glide. Recesses 1016 and 1018 are intended to trap particles that wear from the spacers. These recesses may be sufficient for particle trapping depending on the wear rate of the spacers.

Figure 29:
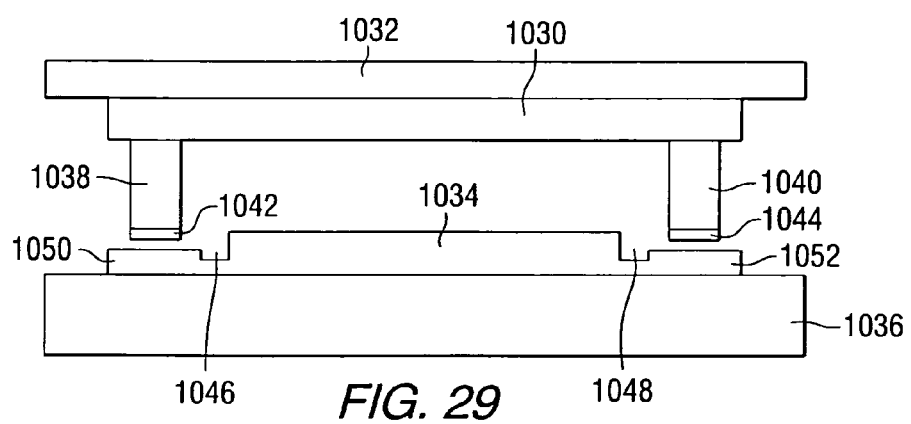

Another embodiment is shown in FIG. 29. In FIG. 29, a storage medium 1030 is mounted on a sled 1032 and a head substrate 1034 is mounted on a package 1036. Spacers 1038 and 1040 are built on the storage medium substrate. A low-friction/low-wear interface 1042 and 1044 is maintained between the head wafer and spacers. Recesses 1046 and 1048 in the head substrate and correspondingly longer spacers are included. Low friction areas 1050 and 1052 are provided on the head substrate. A normal force is required to maintain contact between the spacers and the head wafer.

In this case, the spacers can be added to the storage medium wafer after the intricate fabrication steps, such as sputtering or polishing, for the recording layer are completed. The storage medium wafer is then diced into the appropriate substrate sizes.

Figure 30:
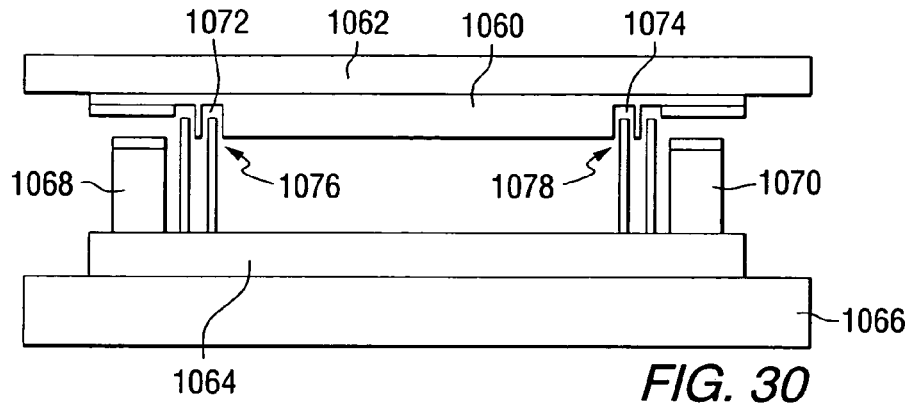

Another example is shown in FIG. 30. In FIG. 30, a storage medium 1060 is mounted on a sled 1062 and a substrate 1064 is mounted on a package 1066. Spacers 1068 and 1070 are built onto the substrate. Recesses 1072 and 1074 in the storage medium area fit the low friction areas. The plane in which friction occurs is not within the gap between the head substrate and the storage medium area used for data storage. Particles possibly generated due to friction are not directly contaminating the data storage area. Labyrinth seals 1076 and 1078 that allow planar motion of the storage medium can additionally seal the head-to-storage medium interface from particles. The labyrinth seals are positioned between the spacers and at least a portion of the storage medium.

In FIG. 30, the spacers are built onto the head substrate. Recesses in the storage medium area fit the low friction areas. The plane in which friction occurs is not within the gap between the substrate and the storage medium area used for data storage. Particles possibly generated due to friction are not directly contaminating the data storage area. They could be kept away from the storage medium by additional particle traps on the outside edges. The spacers may be conveniently fabricated on the head substrate. Minimal additional processing steps are required to recede the storage medium substrate and add low friction areas on the storage medium substrate against which the spacers will glide.

Figure 31:
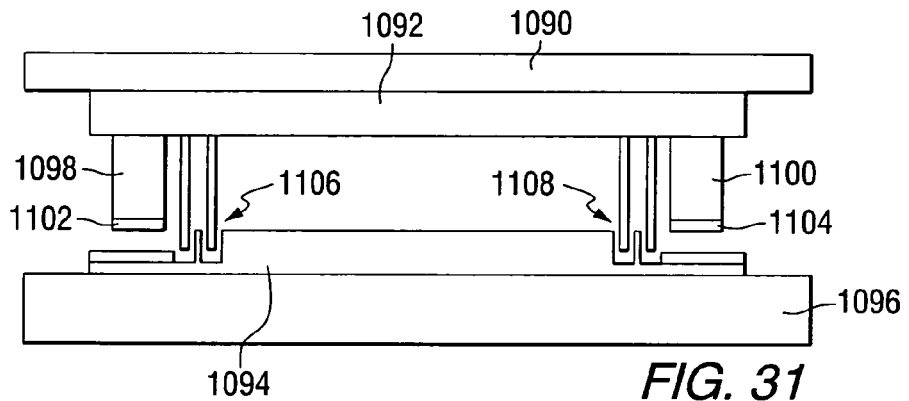

Another example is shown in FIG. 31. In FIG. 31, a storage medium 1090 is mounted on a sled 1092 and a substrate 1094 is mounted on a package 1096. Spacers 1098 and 1100 are built on the storage medium substrate. A low-friction/low-wear interface 1102 and 1104 is maintained between the head wafer and spacers. A normal force is required to maintain contact between the spacers and the head wafer. In this case, the spacers and labyrinth traps 1106 and 1108 may be added to the storage medium wafer after the intricate fabrication steps, such as sputtering or polishing, for the recording layer are completed. The storage medium wafer is then diced into the appropriate substrate sizes.

The recesses in the storage medium substrate and correspondingly longer spacers of FIG. 28 are also applicable as a variation on the embodiments of FIGS. 27, 29 and 30. In the embodiments of FIGS. 28 and 30, the locally decreased storage medium thickness allows the use of smaller magnets for generation of the attractive force.

Figure 32:
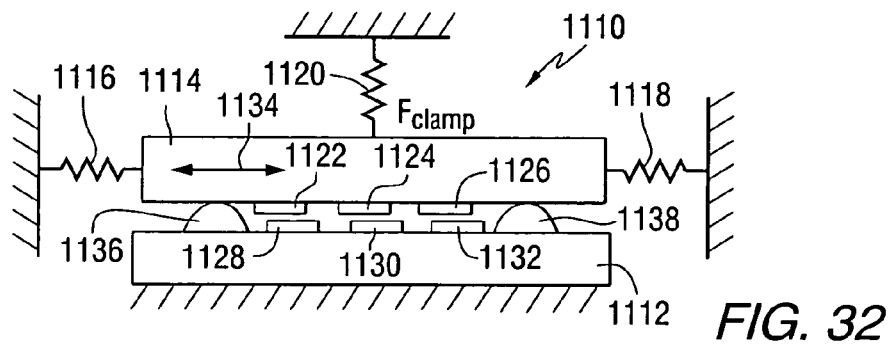
FIG. 32 is a schematic representation of another device constructed in accordance with an embodiment of the invention.
Figure 33:
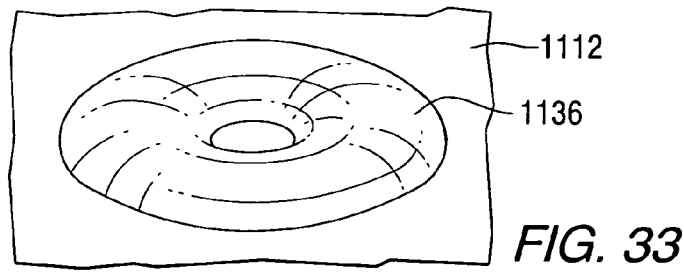
FIG. 33 is a schematic representation of an alternative spacer configuration.

FIG. 32 is a schematic representation of another actuated device 1110 constructed in accordance with an embodiment of the invention. The device 1110 includes first and second substrates 1112 and 1114, wherein the first substrate 1112 is stationary, such as by being mounted on a case or enclosure, and the second substrate is supported by a suspension illustrated by springs 1116 and 1118. A normal clamping force $F_{clamp}$ is schematically illustrated as being applied by a spring 1120. Electrodes 1122, 1124, 1126, 1128, 1130 and 1132 form an electrostatic actuator that is used to move substrate 1114 in the direction indicated by arrow 1134. Spacers 1136 and 1138 are used to maintain the gap between the substrates. FIG. 33 shows one of the spacers 1136 of FIG. 32.

The posts form sliding contact micro-bearings that can be used for both linear and rotary positioning applications. The various described configurations can be used in other types of actuation systems, such as micro-positioners, translating stages, scanners, or actuated systems with gliding surfaces. For linear systems, the gliding surfaces may be flat, but for rotary systems, the gliding surfaces may be curved. In this aspect, the invention provides first and second surfaces separated by a gap, and a plurality of spacers defining a distance between the first and second surfaces, wherein the spacers include a curved end.

The surfaces that contact the spacers can be coated with lubricant to further reduce friction around the spacers.

In the examples described herein, the storage medium is assumed to be attached to a moving sled and the head substrate is assumed to be fixed to the package. However, it should be understood that the invention also encompasses configurations where the head substrate is mounted on a moving sled and the storage medium is stationary.

While the invention has been described in terms of several embodiments, it will be apparent to those skilled in the art that various changes can be made to the described embodiments without departing from the scope of the invention as set forth in the following claims.

What is claimed is:

1. An apparatus comprising:
a storage medium;
a substrate separated from the storage medium by a gap; and
a plurality of spacers including a magnetic material and defining a distance between the storage medium and the substrate, wherein the spacers include a curved end.

2. The apparatus of claim 1, wherein:
the curved end forms a portion of a spherical, cylindrical, or toroidal surface.

3. The apparatus of claim 1, further comprising:
a layer of low friction material positioned on the curved end of each of the spacers.

4. The apparatus of claim 1, wherein the spacers are mounted on the substrate.

5. The apparatus of claim 1, further comprising:
a plurality of magnets for applying a force urging the substrate toward the storage medium.

6. The apparatus of claim 1, further comprising:
a plurality of electrodes separated from each other to form a capacitive sensor.

7. The apparatus of claim 1, further comprising:
a plurality of electrodes separated from each other to form an electrostatic actuator.

8. The apparatus of claim 1, further comprising:
a labyrinth seal between the spacers and a portion of the storage medium.

9. The apparatus of claim 1, further comprising:
a damping material in the spacers.

10. The apparatus of claim 1, further comprising:
recesses in the storage medium.

11. An apparatus comprising:
a storage medium;
a substrate separated from the storage medium by a gap; and
a plurality of spacers including a damping material and defining a distance between the storage medium and the substrate, wherein the spacers include a curved end.

12. The apparatus of claim 11, wherein:
the curved end forms a portion of a spherical, cylindrical, or toroidal surface.

13. The apparatus of claim 11, further comprising:
a layer of low friction material positioned on the curved end of each of the spacers.

14. The apparatus of claim 11, wherein the spacers are mounted on the substrate.

15. The apparatus of claim 11, further comprising:
a plurality of magnets for applying a force urging the substrate toward the storage medium.

16. The apparatus of claim 11, wherein the spacers include a magnetic material.

17. The apparatus of claim 11, further comprising:
a plurality of electrodes separated from each other to form a capacitive sensor.

18. The apparatus of claim 11, further comprising:
a plurality of electrodes separated from each other to form an electrostatic actuator.

19. The apparatus of claim 11, further comprising:
a labyrinth seal between the spacers and a portion of the storage medium.

20. The apparatus of claim 11, further comprising:
recesses in the storage medium.

* * * * *